United States Patent [19]

Pavey et al.

[11] Patent Number: 4,864,563
[45] Date of Patent: Sep. 5, 1989

[54] METHOD FOR ESTABLISHING AND MAINTAINING A NODAL NETWORK IN A COMMUNICATION SYSTEM

[75] Inventors: Charles F. Pavey, Seminole; Billy R. Poston; Arthur M. Richard, both of St. Petersburg, all of Fla.

[73] Assignee: E-Systems, Inc., Dallas, Tex.

[21] Appl. No.: 294,912

[22] Filed: Jan. 9, 1989

Related U.S. Application Data

[63] Continuation of Ser. No. 889,569, Jul. 25, 1986, abandoned.

[51] Int. Cl.$^4$ ............................................. H04J 3/26
[52] U.S. Cl. .............................. 370/94.1; 370/85.15; 370/85.7
[58] Field of Search ............... 370/89, 85, 94, 60, 370/54; 340/825.5, 825.51, 825.52, 825

[56] References Cited

U.S. PATENT DOCUMENTS

| | | | |
|---|---|---|---|
| 3,106,698 | 10/1963 | Unger | 364/200 |
| 3,229,115 | 1/1966 | Amarel | 364/200 |
| 3,388,381 | 6/1968 | Prywes et al. | 364/200 |
| 3,794,983 | 2/1974 | Sahin | 364/200 |
| 4,177,514 | 12/1979 | Rupp | 364/200 |
| 4,396,983 | 8/1983 | Segarra et al. | 364/200 |
| 4,437,158 | 3/1984 | Alfke et al. | 364/200 |
| 4,491,946 | 1/1985 | Kryskow et al. | 370/89 |
| 4,649,535 | 3/1987 | Ulug | 370/86 |

Primary Examiner—Douglas W. Olms
Attorney, Agent, or Firm—Albert M. Crowder, Jr.

[57] ABSTRACT

A method for establishing and maintaining a nodal network in a communication system is described using a network connectivity matrix at each node of the network. The network connectivity matrix has a plurality of channels each corresponding to a node of the network and storing nodal information about the connectivity status of the node in the network. Each channel (row) of the network connectivity matrix at each node includes a first field for storing data indicating whether a usable line-of-sight (LOS) transmission path exists between the node and each other node of the network, a second field for storing data indicating when the row was last revised, a third field for storing the identification of the most recent transmission received by the node and a fourth field for storing data indicating a quality of the transmission path between the node and each node within LOS of the node. A method of routing information uses the network connectivity matrix to control distribution of messages throughout the network in a global fashion as well as between specific source and destination nodes.

22 Claims, 3 Drawing Sheets

METHOD FOR ESTABLISHING AND MAINTAINING A NODAL NETWORK IN A COMMUNICATION SYSTEM

This application is a continuation of now abandoned application Ser. No. 06/889,569, filed July 25, 1986.

TECHNICAL FIELD

The present invention relates to a nodal network communications protocol and more particularly to a method for establishing and maintaining a nodal network in a communications system by identifying changes in the network and for distributing network control information throughout the network.

BACKGROUND OF THE INVENTION

A method is well known in the prior art to form a radio network composed of two to "n" nodes which are geographically dispersed at mobile or fixed locations. In such networks, the nodes are "connected" if a so-called "line-of-sight" (LOS) distance between two nodes allows direct transfer of data. Previously, LOS connectivity information was gathered and disseminated using transmissions termed "radio-on-packets" ("ROP's"). ROP's were generated periodically by each node and broadcast to neighboring LOS nodes. Nodes receiving these LOS transmissions would use information contained within the ROP to update stored connectivity information. Thereafter, the node would rebroadcast the original ROP so that other nodes could be updated as required. For an "n" node network, this prior art "flooding" approach required "n×n" transmissions for a complete network update. The "ROP" transmissions were repeated on a periodic basis to detect and distribute network connectivity changes.

Such prior art network maintenance schemes are inefficient and costly because the time required for ROP transmissions prohibitively consumes a significant portion of the channel capacity. This constraint limits the ability of the network to effectively support user messages. There is therefore a need for an improved method for forming and maintaining a nodal network which overcomes these and other problems of the prior art.

BRIEF SUMMARY OF THE INVENTION

According to the present invention, a method for forming and maintaining a nodal network establishes a network connectivity matrix at each node of the network, the network connectivity matrix having a plurality of rows each corresponding to a node of the network and storing nodal information about a status of the node in the network. In the preferred embodiment, each row of the network connectivity matrix at each node includes a first field for storing data indicating whether a line-of-sight (LOS) transmission path exists between the node and each other node of the network, a second field for storing data indicating when the row was last revised, a third field for storing data about a most recent transmission received by the node and a fourth field for storing data indicating a quality of the transmission path between the node and each node within LOS of the node.

According to a first feature of the invention, a method for forming a network uses a process which adds individual nodes to an existing network. The process of adding a new node to the network begins with the step of repeatedly generating to the network a sign-on message from the new node to be added to the network. The process then determines for each other node of the network whether the other node has received the sign-on message from the new node. If so, a status message is transmitted from the other node to the new node, the status message including the network connectivity matrix of the other node. A test is then made to determine whether the new node is receiving status messages from nodes in the network after a predetermined number of sign-on messages have been generated by the new node. If not, the new node is then added to the network. A global status message is then transmitted from the new node to each node in the network to indicate that the new node has been added to the network.

The invention also relates to a method for identifying connectivity changes in a network of nodes which begins with a step of determining whether a source node in a network senses a connectivity change between the source node and a destination node of the network. If the source node senses a connectivity change, the source node transmits a query message to the destination node to determine if the connectivity change has occurred. In one embodiment, a test is then made to determine whether the source node has received a response to the query message from the destination node. If the source node has not received a response to the query message, the network connectivity matrix of the source node is then updated to reflect that a connectivity change (i.e., a loss of connectivity) has occurred between the source and destination nodes.

In the preferred embodiment, the invention also relates to a method for maintaining a network of nodes which begins by determining whether a line-of-sight (LOS) transmission path exists between a source node and a destination node of the network. If so, the nodal information in the network connectivity matrices of the source and destination nodes is compared on a row-by-row basis to determine if the network connectivity matrix of the source node has been revised later than the network connectivity matrix of the destination node. If the network connectivity matrix of the source node has been revised later, the network connectivity matrix of the destination node is then updated. A global status message is then generated to the rest of the network by the destination node.

The present invention also relates to a method for global routing of information between nodes of a network. According to the method, a source node transmits a global status message to its LOS nodes to be routed to all nodes of the network. A test is then made at each LOS node to determine whether such other node has received the global status message transmitted from the source node. If so, the receiving node calculates a number of relays needed to transmit the global status message to other nodes of the network. The global status message is then retransmitted to the rest of the network based on the calculated relay levels.

Finally, a method for routing a connectivity message between a source node and a destination node of a network begins when a source node transmits a message to a relay node in the network. The relay node is located at a position in the network intermediate of the source and destination nodes. A test is then made to determine whether the destination node is within a line-of-sight (LOS) of the relay node. If so, the message is transmitted from the relay node to the destination node. If the destination node is not within the line-of-sight (LOS) of the relay node, the location (in the network) of a new relay node is calculated and the process is repeated until the new relay node is within LOS of the destination node.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
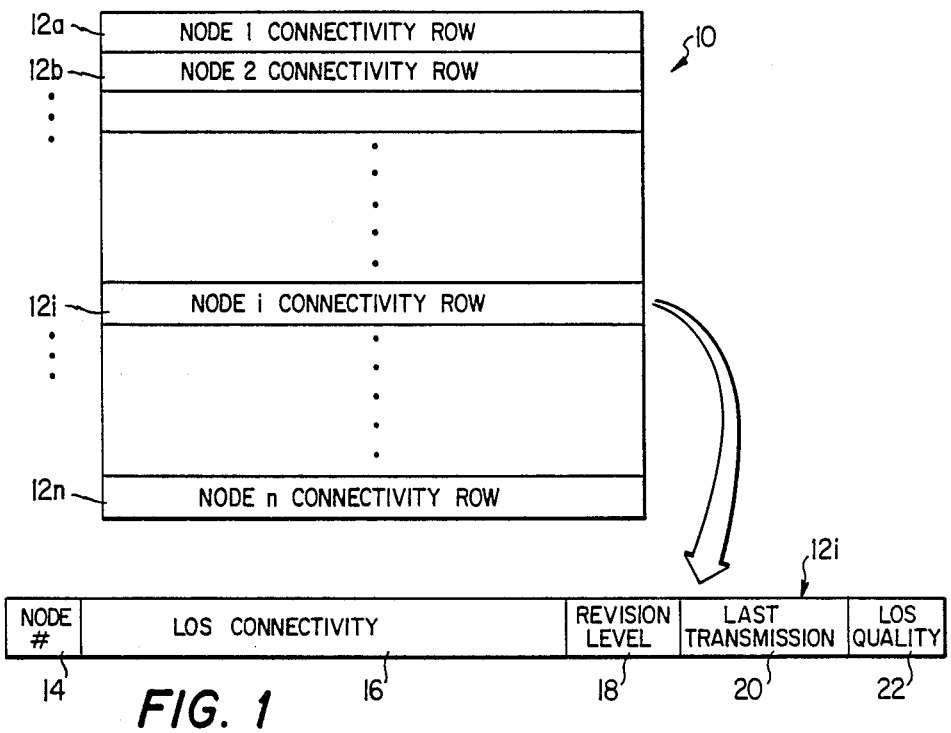
FIG. 1 is a representation of a preferred network connectivity matrix structure of the present invention.

With reference now to the FIGURES wherein like reference characters designate like or similar steps throughout the several views, FIG. 1 is a representation of a preferred network connectivity matrix 10 of the present invention. The network connectivity matrix 10 is used to maintain full connectivity information at each node of a network composed of from one to "n" nodes. Such nodes may be geographically dispersed, may vary on a real-time basis, and may be at mobile or fixed locations. Each node of the network maintains a single version of the network connectivity matrix 10 which is only changed or updated under certain conditions to be described below.

The network connectivity matrix 10 stored at each node completely describes the network by identifying the connectivity mapping between nodes. According to the invention, the network connectivity matrix 10 at each node includes a plurality of rows $12a$–$12n$ each corresponding to a node of the network for storing nodal information about the connecting status of the node in the network. As seen in FIG. 1, an exploded view is shown of the $i^{th}$ row $12i$ of the network connectivity matrix 10. The row $12i$ is identical to the other rows 12 of the network connectivity matrix 10 and preferably includes a node number 14 identifying the node. The node number is preferably an eight (8) bit number.

The row $12i$ also includes an "LOS Connectivity" field 16 (i e., an "n" bit vector) which comprises a single bit per node indicating the existence of a usable line-of-sight (LOS) transmission path between the $i^{th}$ node and each other node of the network. In the preferred embodiment, a "1" bit indicates a usable line-of-sight transmission path (i.e., direct transfer of data may be made between the nodes) and a "0" indicates the lack of a transmission path. The row $12i$ also includes a "Revision Level" field 18 which, in the preferred embodiment, is a eight (8) bit sequential indicator of the revision status of the row. This field is changed only by the node identified by the row node number 14. The row $12i$ also includes a "Last Transmission" field 20 which is preferably a sixteen (16) bit serial number of the most recently received transmission by the node. Finally, the row includes a "LOS Quality" field 22 which is preferably an eight (8) bit pattern defining the quality of the transmission path between the $i^{th}$ node and each node within LOS of the $i^{th}$ node. As will be described below, use of the fields 16, 18, 20 and 22 facilitates improved network maintenance over prior art network communication protocols.

Full connectivity between the nodes in the network is maintained through use of the network connectivity matrix 10 substantially as shown in FIG. 1. As discussed above, associated with each row 12 of the matrix 10 is information identifying nodal configuration and update status. This information is preferably passed between nodes using transmissions termed "radio-on-packets" (ROP's). In the preferred embodiment, five (5) types of ROP's are used:

TABLE I

1. Sign-on ROP (SOROP): "This is node i. Respond if you can hear this message."
2. Status ROP (SROP): "This is node j. I have received the message from node i and the network connectivity matrix for this node is . . . "
3. Global ROP (GROP): "This is node i and the network connectivity matrix for this node is . . . "
4. Query ROP (QROP): "This is node i, if you are node j, then reply with a SROP."
5. Acknowledge (ACK): "This is node i. I acknowledge receipt of a SROP from node j."

As will be described in more detail below, the method of the present invention provides for minimal ROP transmissions in order to distribute nodal information throughout the network.

Figure 2:
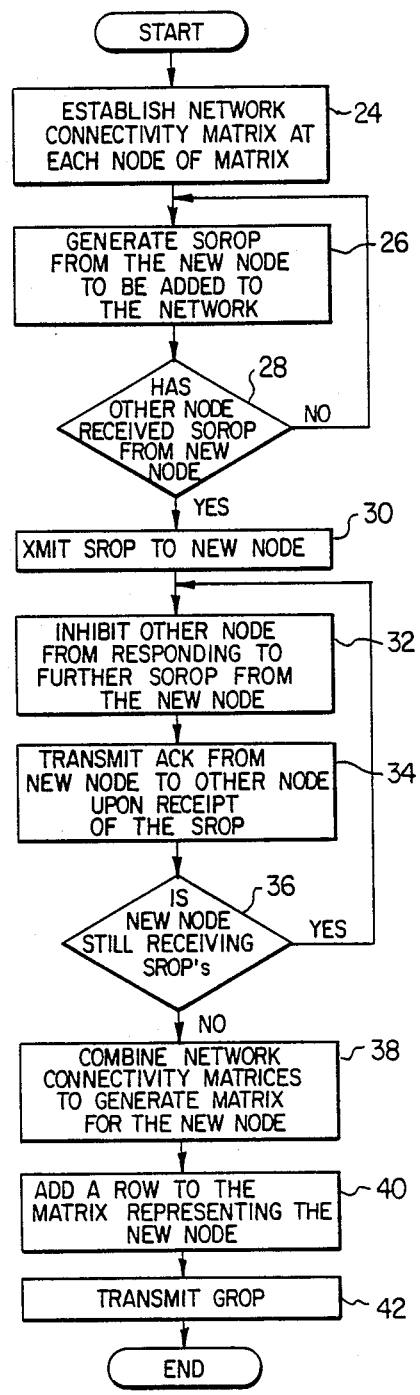
FIG. 2 is a flowchart of a preferred method of the present invention for forming a nodal network by adding a new node to a network of nodes.

According to a feature of the invention, a method for adding a new node to a network of nodes is illustrated by the flowchart representation shown in FIG. 2. The method for adding a new node to the network shown in FIG. 2 is used to facilitate initial network entry of a new node to the network (e.g., upon power-up of the network).

Referring now to FIG. 2, the method for adding a new node to a network begins at step 24 wherein the network connectivity matrix 10 of FIG. 1 is established at each node, the network connectivity matrix having a plurality of rows 12 each corresponding to a node of the network and storing nodal information about the status of the node in the network. At step 26, the new node to be added to the network repeatedly generates a SOROP to the network. The method continues at step 28 to determine for each other node of the network whether the other node has received the SOROP generated by the new node at step 26. If no other node has received the SOROP from the new node, the method returns to step 26.

Any node(s) receiving the SOROP from the new node transmits a SROP to the new node at step 30. The SROP includes all or part of the network connectivity matrix 10 of the other node. In the preferred embodiment, the SROP contains the node numbers 14, LOS connectivity fields 16 and revision level fields 18 of the matrix 10. The method continues in step 32 to inhibit the existing nodes from responding to additional SOROP messages from the new node for a predetermined time after the existing nodes transmit the SROP. At step 34, the new node generates an ACK message to acknowledge receipt of an SROP.

An inquiry is made at step 36 to determine whether the new node is receiving status messages from other nodes in the network after a predetermined number of SOROP's have been generated by the new node. If the new node is still receiving SROP's from other nodes in the network after a predetermined number of SOROP messages have been generated, the method returns back to step 32. However, if the new node is no longer receiving SROP's from nodes in the network after a predetermined number of SOROP messages have been generated by the new node, the method continues at step 38 to combine the network connectivity matrices in the status messages received by the new node (from the other nodes of the network) to generate a network connectivity matrix 10 for the new node. In step 40, the method adds a row to the network connectivity matrix 10 of the new node for storing nodal information representing the status of the new node in the network. Finally, at step 42, the new node transmits a GROP to each node in the network to indicate that the new node has been fully integrated into the network. The global status message transmitted from the new node includes the network connectivity matrix 10 of the new node generated at step 40.

Accordingly, it can be seen that the method of the present invention forms a network by using a routine to add new nodes to the network. As discussed above, the new node initiates the process by broadcasting a SOROP to the network. Any nodes receiving the SOROP respond with a SROP. Upon receipt of the SROP, the new node responds with an ACK message and further SOROP transmissions from the new node do not result in a duplicate SROP from the other node. The new node continues to transmit SOROP packets until a predetermined number of transmissions spaced a predetermined time period apart result in no response from other nodes. After all SROP's have been received, the new node then combines the connectivity information received, adds itself to the matrix, and initiates a GROP to distribute its network connectivity matrix throughout the network.

Figure 3:
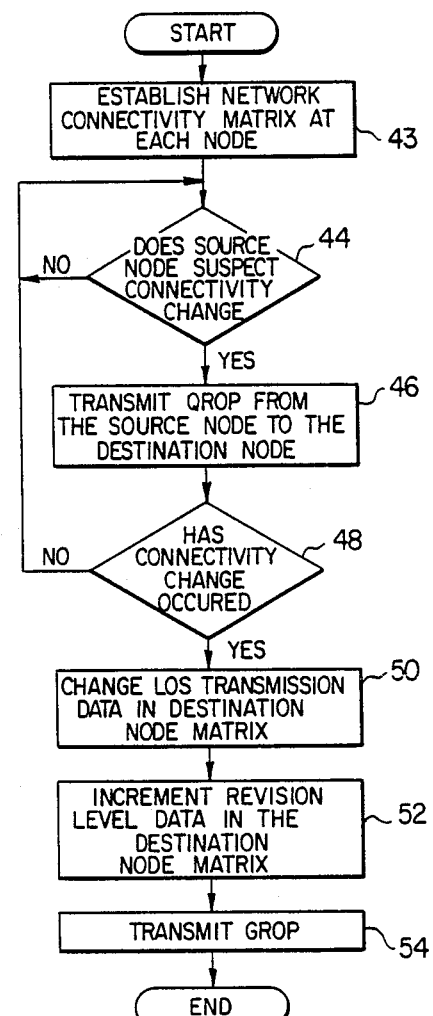
FIG. 3 is a flowchart diagram of a preferred method of the present invention for identifying connectivity in the nodal network.

Referring now to FIG. 3, a flowchart representation is shown of a preferred method for identifying connectivity changes in an existing network of nodes. At step 43, the method for identifying connectivity changes establishes the network connectivity matrix 10 of FIG. 1 at each node, the network connectivity matrix having a plurality of rows 12 each corresponding to a node of the network and including the first field 16 for storing data indicating whether a usable line-of-sight (LOS) transmission path exists between the node and each other node of the network, the second field 18 for storing data indicating when the row was last revised, the third field 20 for storing data about the most recent transmission received by the node and the fourth field 22 for storing data indicating the quality of the transmission path between the node and each node within LOS of the node.

An inquiry is made at step 44 to determine whether or not a connectivity change has been made between a source node and a destination node of the network. If not, the method returns to inquiry 44. If a connectivity change at a source node is indicated, the method continues at step 46 to transmit a QROP from the source node to the destination node to determine if the connectivity change has occurred. Thereafter, an inquiry is made at step 48 to determine whether a connectivity change has occurred. Such a change takes place in one of two ways: (1) by detecting the existence of a new LOS connection (i.e., an addition) between the source and destination nodes where none existed previously, or (2) by detecting that an existing LOS connection between the nodes has been lost (i.e., a loss). Accordingly, in the case where a loss of LOS connectivity has occurred, step 48 evaluates whether the source node has received a SROP from the destination node in response to a transmitted QROP. If the source node has not received a response to the QROP, then loss of connectivity has occurred.

The method continues at step 50 to reflect the addition or loss of LOS connectivity between the source node and destination node by changing the LOS transmission path data in the appropriate network connectivity matrix. For example, where loss of connectivity occurs, the method will change the LOS bit in the row in the source node matrix corresponding to the destination node from a "1" to a "0." Following revision of the LOS transmission path data in the first field, the method continues at step 52 by incrementing the data in the second field of the row in the source node matrix corresponding to the destination node. At step 54, a GROP is transmitted to each other node in the network to indicate that the connectivity change between the source node and the destination node has occurred. As described above, the GROP includes the updated network connectivity matrix of the source or destination node.

Figure 4:
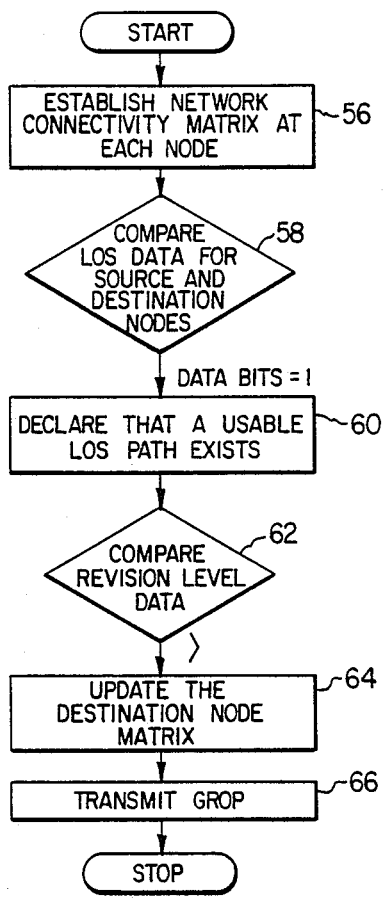
FIG. 4 is a flowchart of a preferred method of the present invention for maintaining a nodal network.

Referring now to FIG. 4, a flowchart representation is shown of a method for maintaining a network of nodes according to the invention. At step 56, the network connectivity matrix 10 is established as described with reference to FIGS. 2 and 3. As discussed previously, the network connectivity matrix includes a plurality of rows 12 each corresponding to a node in the network, wherein each row of the network connectivity matrix includes the fields as discussed.

The method then continues by determining whether a usable line-of-sight (LOS) transmission path exists between a source node and a destination node of the network. In particular, at step 58 a comparison of the data in the first field of a row (identifying the destination node) in the source node network connectivity matrix 10 is made between data in the first field of a row (corresponding to the source node) in the network connectivity matrix 10 of the destination node. If the compared data has the same predetermined value (i.e., a "1" bit), the method continues at step 60 to declare that a usable LOS transmission path exists between the source node and destination node. The method continues at step 62 by comparing data in the second field of the row (corresponding to the destination node) in the network connectivity matrix 10 of the source node with data in the second field of the row (corresponding to the source node) in the network connectivity matrix 10 of the destination node. If the data in the source node network connectivity matrix 10 is different from (or varies by more than a predetermined amount from) the data in the network connectivity matrix of the destination node, the method continues at step 64 to update the destination node network connectivity matrix. The updated network connectivity matrix 10 is then transmitted to all other nodes of the network in step 66 via a GROP.

Accordingly, in the method of FIG. 4 for maintaining the network, a node compares a received matrix to its existing matrix on a row-by-row basis and changes the existing matrix only in those cases where the row of the received matrix has a later "Revision Level" than the existing row of the receiving node. The decision as to whether the "Revision Level" is later than the existing "Revision Level" is preferably based on the rule that the later "Revision Level" value is greater than the previous value or varies (+/−) from the earlier level by more than 50% of a predetermined maximum value of the "Revision Level" field value.

Referring back to FIG. 4, step 64 of the method updates the data in the LOS Quality field of the network connectivity matrix. As described above, this field indicates the quality of the LOS transmission path between the source node and the destination node. The LOS Quality entry in the network connectivity matrix 10 is determined (after establishing that a valid LOS path exists at step 60) by filling all eight bits of this field with a "one." Upon receipt of any transmission from a node (whether the source node or otherwise), a comparison is made between the serial number of that transmission and the "Last Transmission" serial number stored in the third field of the row for the destination node. The bit pattern in the "LOS Quality" field is then modified by shifting the existing bit pattern to the right by inserting leading "zeros" in an amount equal to the difference in the "Last Transmission" serial number minus one, and then further shifting to the right by the insertion of a "one" bit.

Continuing at step 64, after updating the "LOS Quality" field, a test is made to determine if the "LOS Connectivity" bit for the destination node contains a "one" and whether a predetermined number of least significant bits of the "LOS Quality" field are all zeros. If so, a QROP is initiated, as described above with reference to FIG. 3, to determine if the destination node still has LOS connectivity. However, if the "LOS Connectivity" field for the destination node contains a "zero" and the "LOS Quality" field contains more than a predetermined number of "ones", a QROP is initiated (as in FIG. 3) to determine if "LOS Connectivity" has been established. If the results of the QROP indicates that a change in connectivity between the destination node and another node has occurred, the destination node then updates the appropriate "LOS Connectivity" field, increments the "Revision Level" field, and initiates a GROP to distribute the change throughout the network.

Therefore, the method only updates the network connectivity matrix based on recent experience in receiving transmissions. This "hysteresis" approach minimizes ROP transmissions while at the same time providing effective distribution of nodal information throughout the network.

Figure 5:
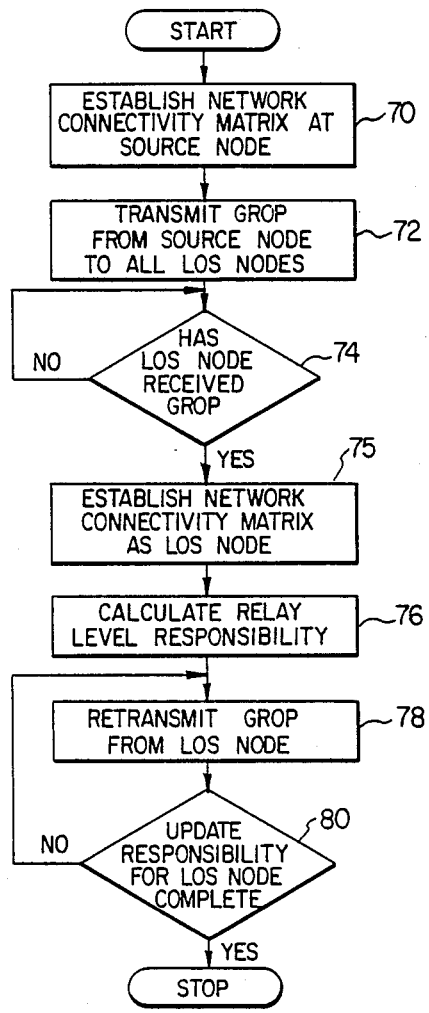
FIG. 5 is a flowchart diagram of a preferred method of the present invention for global routing of information between nodes of the network.

According to another feature of the invention, a method for routing connectivity information between nodes of a network is represented by the flowchart in FIG. 5. Generally, the ROP transmissions are routed through the network on an individual basis with each node in the network responsible for determining the next destination node. Routing decisions are based upon the network connectivity matrix stored in the node making the decision. As discussed above, a LOS transmission path is considered valid only if "LOS Connectivity" field data in both the corresponding source and destination node connectivity matrix rows contain a "one" bit for the respective nodes.

In the preferred embodiment, packets are routed through the network using either a global routing approach, where packets are intended for all nodes in the network, or by a routine packet approach, where packets are routed to individual nodes.

Referring now to FIG. 5, a preferred global routing routine is shown. This routine is used to implement steps 42, 54 and 66 in FIGS. 2, 3 and 4, respectively. The network connectivity matrix 10 of FIG. 1 is established at step 70 for a source node, the network connectivity matrix having a plurality of rows each corresponding to a node of the network and storing nodal information about the status of the node in the network. The source node transmits a global status message at step 72 to all nodes LOS to the source node. This message includes information to be routed between the nodes of the network. Next, an inquiry is made at step 74 to determine whether each LOS node has received the global status message from the source node. If not, step 72 is repeated. If an LOS node has received the global status message from the source node, the method continues at step 75 to establish a network connectivity matrix for that node. At step 76, the LOS node calculates a number of relay nodes needed to transmit the global status message (received from the source node) to the remainder of the network. The method for calculating the number of relay nodes uses the following conventions:

TABLE II

1. Level X = nodes which have no current connectivity "y" in the network;
2. Level 0 = nodes which have LOS Connectivity to the source node;
3. Level 1 = nodes which have LOS Connectivity Level 0 nodes, but which are not included on Level X or 0;
4. Level 2 = nodes which have LOS Connectivity to Level 1 nodes, but are not included in any prior level ... and
5. Level M = nodes which have LOS Connectivity to Level M−1 nodes, but which are not included in any prior level.

The source node also receives an acknowledge (ACK) message from each of the LOS (Level 0) nodes. Failure to receive an ACK results in retransmission.

Referring back to FIG. 5, each LOS node receiving a GROP from the source node computes the relay levels at step 76 for the network and determines relay node responsibility with respect to the source node. The method continues at step 78 by retransmitting the global status message from the relay node to the remainder of the network based on the calculated relay levels. A test at step 80 is then made to determine if the update responsibility for the LOS node is complete. If not, the method returns to step 78.

Packet transmissions which do not require global routing are routed in a similar manner in accordance with the routine of FIG. 5 except that only one relay node at each level is required and relay node responsibility is computed in reverse order substantially as shown in the following Table III:

TABLE III

1. Level M−1 = Lowest address node with LOS Connectivity to the destination node;
2. Level M−2 = Lowest address node with LOS Connectivity to the node selected at the M-one level;
3. Level M−3 = Lowest address node with LOS Connectivity to the node selected at the M-2 level; and ...

4. Level 1=Lowest address node with LOS Connectivity to the node selected at Level 2.

For routine routing, the source node transmits the ROP to the selected Level 1 node for relay to the destination node. The Level 1 node then repeats the routine to determine the next relay node, and the routine continues until the destination node is within LOS of a selected relay node.

Figure 6:
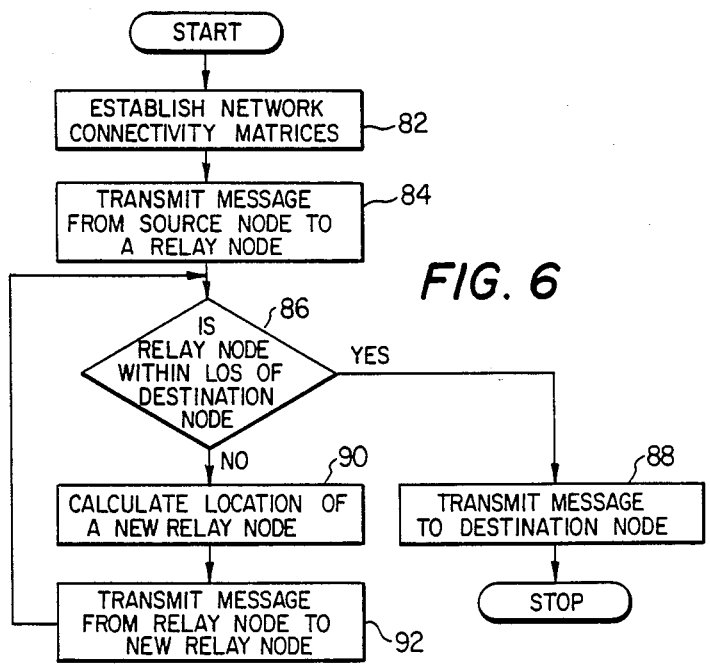
FIG. 6 is a flowchart diagram of a method for routing information between a source node and a destination node of the network.

This process for routing a message between a source node and a destination node is shown by the flowchart in FIG. 6. The method begins at step 82 where the network connectivity matrices are established. A source node transmits at step 84 a message to a relay node in the network, the relay node located at a position in the network intermediate of the source and destination nodes. A test is then made at step 86 to determine whether the destination node is within a line-of-sight (LOS) of the relay node. If so, the method continues at step 88 to transmit the message from the relay node to the destination node. If the destination node is not within the line-of-sight (LOS) of the relay node, the method continues at step 90 to calculate a new relay node which has a path to the destination node. At step 92, the message is transmitted from the relay node to the new relay node. The method then returns to step 86 to determine whether the new relay node is within LOS of the destination node.

In the preferred embodiment, the method for forming and maintaining a network described above may be used in networks employing RF link channels such as a packet radio network. The described methods advantageously compensate for changes in network connectivity that develops the information of independent subnetworks that later merge into a single network. Moreover, these methods handle rapid changes in node-to-node connectivity without producing large amounts of network traffic. Accordingly, the present invention increases network capacity and thus has wide application in tactical RF systems which are often characterized by rapid and frequent fluxuations in signal-to-noise ratio due to propagation path loss and interference.

Although the invention has been described and illustrated in detail, it is to be understood that the same is by way of illustration and example only and is it not be taken by way of limitation. The spirit and scope of this invention are to be limited only by the terms of the appended claims.

We claim:

1. A method for adding a node to a network of existing nodes in a communication system, comprising the steps of:
   compiling a network connectivity matrix at each node, the network connectivity matrix comprising a plurality of data bits defining the connection of the node in the network;
   generating repeatedly to the network a sign-on message from the node to be added to the network;
   computing for each existing node of the network whether each existing node has received the sign-on message from the node to be added;
   when an existing node has received the sign-on message from the node to be added, transmitting a status message from the existing node to the node to be added, the status message including the network connectivity matrix of the existing node;
   adding the node in the network when status messages from existing nodes in the network have been received and after a predetermined number of sign-on messages have been generated by the node to be added; and
   transmitting a global status message from the added node to each other node in the network to indicate that the node has been added to the network.

2. The method of adding a node to a network as described in claim 1 including the steps of:
   combining the network connectivity matrices in the status messages received by the added node from the existing nodes of the network to generate a network connectivity matrix of the added node; and
   adding data bits to be network connectivity matrix of the added node representing the status of the node in the network.

3. The method of adding a node to a network as described in claim 1 wherein the global status message transmitted from the added node includes the network connectivity matrix of the added node.

4. The method of adding a node to a network as described in claim 1 further including the step of:
   generating an acknowledge message from the node to be added to an existing node acknowledging receipt of the status message.

5. The method of adding a node to a network as described in claim 4 including the step of:
   inhibiting an existing node from responding to repeated sign-on messages from the node to be added for a predetermined time after the existing node transmits the status message.

6. The method of adding a node to a network as described in claim 1 further including the steps of:
   when an existing node has received the global status message transmitted from the added node, updating the network connectivity matrix of the existing node to reflect that the node has been added to the network.

7. A method for identifying connectivity changes between nodes in a network of nodes of a communication system, comprising the steps of:
   compiling a network connectivity matrix of each node, the network connectivity matrix comprising a plurality of data bits for storing information defining the connection of the node in a network;
   transmitting a query message from a source node to a destination node
   in response to a query message, evaluating if a node connection change has occurred; and
   when a connection change has occurred between the source node and the destination node, updating the network connectivity matrices of the source node and destination node to reflect that a connection change between nodes has occurred.

8. The method for identifying connectivity changes between nodes in a network of nodes as described in claim 7 wherein the step of evaluating a connection change includes:
   determining whether the source node received a response message to a query message from the destination node; and
   if the source node did not receive a response to the query message, updating the network connectivity matrix of the source node to reflect that a connectivity change has occurred.

9. The method of identifying connectivity changes between nodes in a network of nodes as described in claim 7 wherein data bits of the network connectivity matrix at each node includes data indicating the existence of a usable line-of-sight (LOS) transmission path between the source node and each other node of the network.

10. The method for identifying connectivity changes between nodes in a network of nodes as described in claim 9 wherein the step of updating the network connectivity matrix of the source node includes:
changing the LOS transmission path data in the first field of data bits of the source node network connectivity matrix corresponding to a destination node.

11. The method for identifying connectivity changes between nodes in a network of nodes as described in claim 9 wherein data bits of the network connectivity matrix at each node further includes a second field indicating when the last revision occurred, a third field indicating the most recent transmission received by the node, and a fourth field indicating a quality of the LOS transmission path between the source node and each node within LOS of the source node.

12. The method for identifying connectivity changes between nodes in a network of nodes as described in claim 11 wherein the step of updating the network connectivity matrix of the source node further includes:
incrementing the connectivity data in the second field of data bits of the source node network connectivity matrix corresponding to the destination node.

13. The method for identifying connectivity changes between nodes in a network of nodes as described in claim 10 further including the step of:
transmitting a global status message from the destination node to each other node in the network to indicate that a connectivity change between the source node and the destination node has occurred.

14. The method for identifying connectivity changes between nodes in a network of nodes as described in claim 13 wherein the global status message includes the updated network connectivity matrix of the source node.

15. A method for maintaining a network of nodes in a communication system, comprising the steps of:
compiling a network connectivity matrix at each node, the network connectivity matrix comprising a plurality of data bits defining the connection of the node in the network;
when a usable line-of-sight (LOS) transmission path exists between a source node and a destination node, comparing the network connectivity matrices of the source node and the destination node to determine if the network connectivity matrix of the source node has been revised later than the network connectivity matrix of the destination node; and
if the network connectivity matrix of the source node has been revised later than the network connectivity matrix of the destination node, updating the network connectivity matrix of the destination node.

16. The method for maintaining a network of nodes as described in claim 15 wherein the network connectivity matrix at each node includes a first field for storing connectivity data indicating whether a usable line-of-sight (LOS) transmission path exists between the node and each other node of the network, a second field for storing connectivity data indicating when the data was last revised, a third field for storing connectivity data about a most recent transmission received by the node, and a fourth field for storing data indicating a quality of the LOS transmission path between the node and each node within LOS of the node.

17. The method for maintaining a network of nodes as described in claim 16 wherein the existence of a usable LOS transmission path between the source node and the destination node is determined by the steps of:
comparing the data in the first field of data corresponding to the destination node in the source node network connectivity matrix with the data in the first field of data corresponding to the source node in the destination node network connectivity matrix; and
when the compared data has the same predetermined status, indicating that a usable LOS transmission path exists between the source node and the destination node.

18. The method for maintaining a network of nodes as described in claim 17 including the steps of:
comparing data in the second field of data corresponding to the destination node in the source node network connectivity matrix with the data in the second field of data corresponding to the source node in the destination node network connectivity matrix; and
if the data in the second field of the source node network connectivity matrix differs from the data in the second field of the destination network connectivity matrix, updating the first and second fields of the destination node network connectivity matrix.

19. The method for maintaining a network of nodes as described in claim 16 wherein the step of updating the network connectivity matrix of the destination node includes the step of calculating the data in the fourth field indicating the quality of the LOS transmission path between the source node and the destination node.

20. The method for maintaining a network of nodes as described in claim 15 further including the step of transmitting a global status message from the source node to each other node in the network, the global status message including the updated network connectivity matrix of the source node.

21. A method for routing of information between nodes of a network of nodes in a communication system, comprising the steps of:
compiling a network connectivity matrix at each node, the network connectivity matrix comprising a plurality of data bits defining the connection of the node in the network;
transmitting from a source node a global status message which includes information to be routed between the nodes of the network;
when another node in the network has received the global status message from the source node, calculating a number of relay nodes needed to transmit the global status message from the other node to additional nodes of the network; and
retransmitting the global status message from the other node to the additional nodes of the network based on the calculated number of relay nodes needed.

22. A method for routing a message between a source node and a destination node of a network of nodes in a communication system, comprising the steps of:
(a) compiling a network connectivity matrix at each node of the network, the network connectivity matrix comprising a plurality of data bits defining the connection of the node in the network;

(b) transmitting a message from the source node to a relay node in the network, the relay node located at a location in the network intermediate of the source node and the destination node;

(c) when the destination node is within a line-of-sight (LOS) transmission path of the relay node, transmitting the message from the relay node to the destination node;

(d) when the destination node is not within the line-of-sight (LOS) transmission path of the relay node, calculating a location of a second relay node in the network;

(e) transmitting the message from the relay node to the second relay node; and (f) repeating steps (c) and (d) for the second relay node and any additional relay nodes to identify additional relay nodes until a relay node is within the line-of-sight (LOS) transmission path of the destination node.

* * * * *